(12) United States Patent
Ouyang et al.

(10) Patent No.: US 9,094,056 B2
(45) Date of Patent: Jul. 28, 2015

(54) TEST SYSTEMS WITH MULTIPLE NFC ANTENNAS

(71) Applicant: Apple Inc., Cupertino, CA (US)

(72) Inventors: Yuehui Ouyang, Sunnyvale, CA (US); Mattia Pascolini, San Mateo, CA (US); Dean F. Darnell, Durham, NC (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 14/043,636

(22) Filed: Oct. 1, 2013

(65) Prior Publication Data

US 2015/0093987 A1   Apr. 2, 2015

(51) Int. Cl.
| | |
|---|---|
| *H04B 17/00* | (2015.01) |
| *G01R 29/08* | (2006.01) |
| *G01R 29/10* | (2006.01) |
| *H04B 5/00* | (2006.01) |

(52) U.S. Cl.
CPC .............. *H04B 5/0043* (2013.01); *H04B 17/00* (2013.01)

(58) Field of Classification Search
USPC ................ 455/41.1, 63.4, 66.1, 67.11, 67.12, 455/67.13
See application file for complete search history.

(56) References Cited

U.S. PATENT DOCUMENTS

| | | | |
|---|---|---|---|
| 8,331,869 B2 | 12/2012 | Foegelle | |
| 8,527,229 B2 | 9/2013 | Chang et al. | |
| 2013/0093447 A1 | 4/2013 | Nickel et al. | |
| 2013/0149972 A1 | 6/2013 | Luong et al. | |
| 2013/0178203 A1* | 7/2013 | Venkataraman | 455/423 |
| 2013/0197850 A1* | 8/2013 | Yu et al. | 702/117 |
| 2013/0257454 A1 | 10/2013 | Mow et al. | |

* cited by examiner

*Primary Examiner* — Blane J Jackson
(74) *Attorney, Agent, or Firm* — Treyz Law Group; Joseph F. Guihan (57) ABSTRACT

A test station may include a test host, testing devices, and a test enclosure. A device under test (DUT) having a near-field communications (NFC) antenna may be placed in the test enclosure during production testing. The testing devices may have test antennas that may convey NFC test signals to the DUT in the test enclosure. Distances between test antennas and the DUT may be monitored by measuring path loss from the test antennas throughout testing. The testing station may also include a test unit and an RF test antenna. The test unit may use the RF test antenna to convey RF test signals to the DUT in the test enclosure. The DUT is marked as a passing DUT if gathered test data is satisfactory for each testing device in the test station and distance measurements between the test antennas and the DUT throughout testing are consistent with calibration measurements.

15 Claims, 9 Drawing Sheets

TEST SYSTEMS WITH MULTIPLE NFC ANTENNAS

BACKGROUND

This relates generally to testing electronic devices and more particularly, to testing electronic devices with wireless communications circuitry.

Wireless electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry such as near field communications (NFC) circuitry. Near field communications schemes involve electromagnetically coupled communications over short distances, typically 20 cm or less.

Test stations measure the performance levels of each wireless electronic device under test (DUT) to ensure that each DUT satisfies design criteria. A test station typically includes a test host, a tester, and an electromagnetic shielding test enclosure in which the DUT can be placed during testing. An NFC test antenna can be placed within the test enclosure to communicate with NFC circuitry within the DUT. In conventional NFC testing arrangements, a test station would typically include only one NFC test antenna for use in communicating with the wireless DUT. A properly designed DUT (or "passing" DUT) should be able to communicate successfully with the NFC test antenna at a specified distance.

Testing a device with only one NFC test antenna allows for the distance between the DUT and the NFC test antenna to be easily adjusted during testing. As a result, it is possible for the test host to obtain inconsistent or inaccurate test data. For example, it is not uncommon for DUTs exhibiting unsatisfactory performance to be improperly categorized as passing DUTs.

It may therefore be desirable to provide improved ways for testing NFC communication performance of electronic devices.

SUMMARY

A test system for testing a device under test (DUT) may include first and second near field communications (NFC) testing devices. The DUT may include an NFC device antenna. The first NFC testing device may communicate with the DUT by sending test signals to the NFC device antenna. While the first NFC testing device is communicating with the device under test, the second NFC testing device may also communicate with the device under test by sending test signals to the NFC device antenna. The test system may determine whether the NFC device antenna in the DUT satisfies design criteria based on test data gathered using the first and second NFC testing devices, such as determining whether communications between the NFC device antenna and the first and second NFC testing devices are satisfactory.

The DUT may be placed in a shielded test enclosure (e.g., test box) and positioned between the first and second NFC testing devices during testing. The shielded test box may be a transverse-electromagnetic cell that provides isolation from outside environment for the DUT when the DUT is subjected to electromagnetic compatibility radiated tests.

If communications between the NFC device antenna and both the first and second NFC test devices are determined to be satisfactory, the test system may determine that the NFC device antenna in the DUT satisfies design criteria. If the communications between the NFC device antenna in the DUT and the first NFC test device is determined to be unsatisfactory, the test system may determine that the NFC device antenna in the DUT fails to satisfy design criteria.

Testing the DUT may include calibrating the test system to ensure that distance separating the first and second NFC testing devices is within a desired range. If deviations from the calibrated distance separating the first and second NFC testing devices are detected, the test system may determine that the test data gathered using the first and second NFC testing devices is unreliable. Deviations from the calibrated distance may be detected by monitoring the path loss between the first and second NFC testing devices.

The test system used to perform wireless testing on a wireless electronic device may include a test host. The test system may also include a radio-frequency test unit that conveys radio-frequency test signals to the DUT via a radio-frequency test antenna positioned within the shielded test box. The test system may obtain radio-frequency and NFC test measurements from the wireless electronic device that is undergoing the wireless testing.

Testing the wireless electronic device may include retrieving a serial number from a wireless electronic device that is connected to the test host via a wired path, where the serial number identifies that wireless electronic device. A NFC testing device may wirelessly retrieve a near field communications secure identification number from a wireless electronic device that is undergoing wireless testing. The test host may compare the serial number with the NFC secure identification number in order to determine that the wireless electronic device from which the serial number was retrieved is the wireless electronic device from which the NFC secure identification number was retrieved.

Further features of the present invention, its nature and various advantages will be more apparent from the accompanying drawings and the following detailed description.

DETAILED DESCRIPTION

Figure 1:
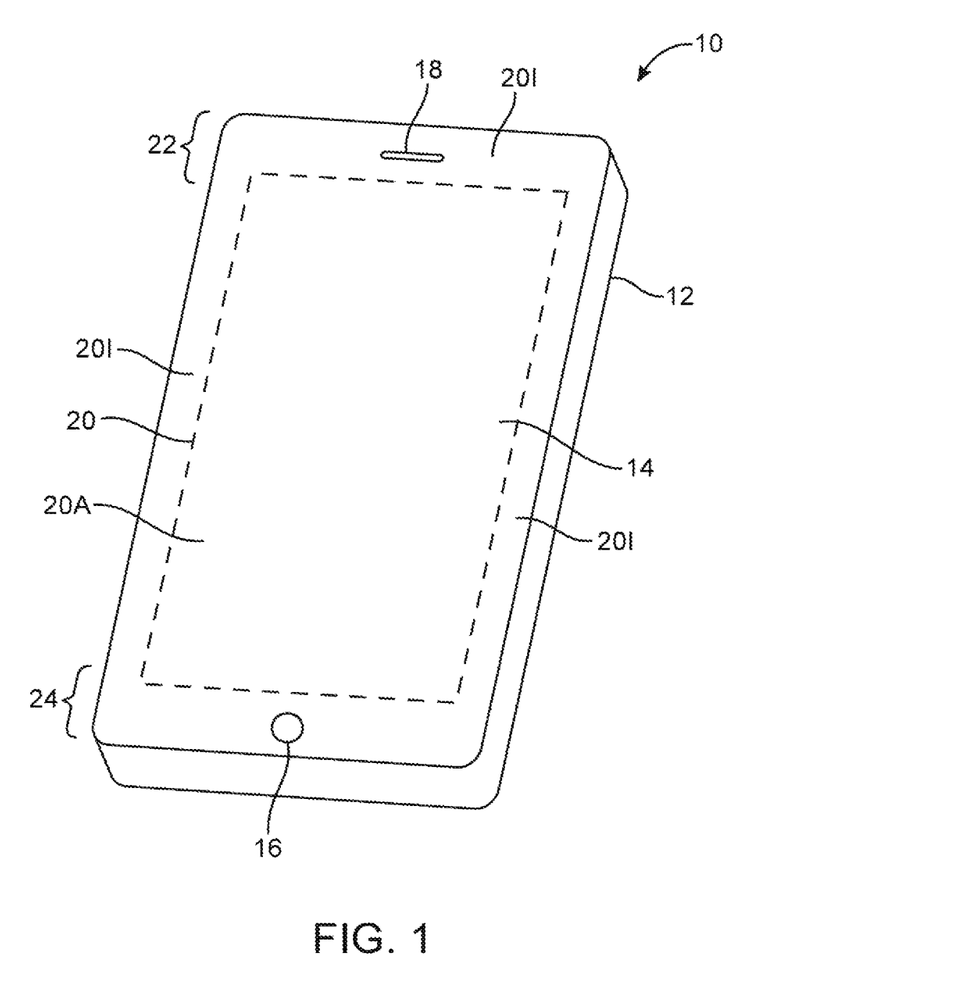
FIG. 1 is a perspective view of an illustrative electronic device with wireless communications circuitry in accordance with an embodiment of the present invention.

Electronic devices such as electronic device 10 of FIG. 1 may be provided with wireless communications circuitry.

The wireless communications circuitry may be used to support wireless communications in multiple wireless communications bands. The wireless communications circuitry may include antenna structures such as antenna structures that include loop antennas, inverted-F antennas, strip antennas, planar inverted-F antennas, slot antennas, hybrid antennas that include antenna structures of more than one type, or other suitable antennas.

Antenna structures may, if desired, be formed from conductive electronic device structures. The conductive electronic device structures may include conductive housing structures. The housing structures may include a peripheral conductive member that runs around the periphery of an electronic device. The peripheral conductive member may serve as a bezel for a planar structure such as a display and/or may form vertical sidewalls for the device.

The antenna structures may be configured to handle both near field communications (e.g., communications in a near field communications band such as a 13.56 MHz band) and non-near-field communications (sometimes referred to as far field communications) such as cellular telephone communications, wireless local area network communications, and satellite navigation system communications. Near field communications typically involve communication distances of less than about 20 cm. Far field communications typically involve communication distances of multiple meters or miles.

Signal combining circuitry such as a duplexer or switching circuitry may be used to allow a near field communications transceiver and non-near-field-communications transceiver circuitry to share the antenna structures. By reducing or eliminating the need for separate near field communications antenna structures to handle near field communications signals, antenna structures that are shared between near field communication and non-near-field-communications circuitry can help minimize device size.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, a television, a computer monitor, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 20I may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 front the ground plane, or may otherwise serve as part of antenna structures formed in regions 22 and 24.

Antennas in device 10 may be used to support any communications bands of interest. For example, device 10 may include antenna structures for supporting non-near-field-communications such as local area network communications, voice and data cellular telephone communications, global positioning system (GPS) communications or other satellite navigation system communications. Bluetooth® communications, etc. Device 10 may use at least part of the same antenna structures for supporting near field communications (e.g., communications at 13.56 MHz).

Figure 2:
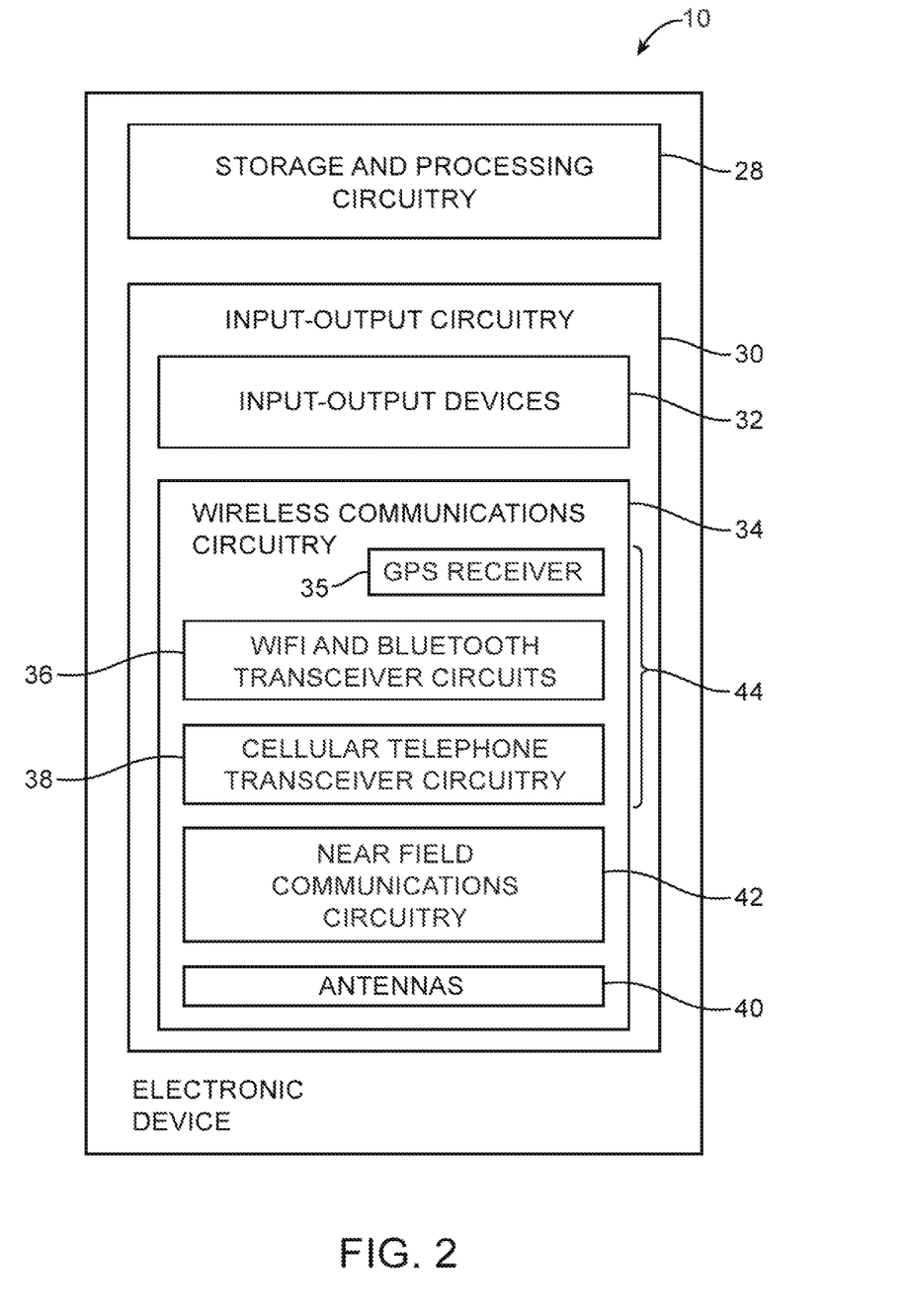
FIG. 2 is a schematic diagram of an illustrative electronic device with wireless communications circuitry in accordance with an embodiment of the present invention.

A schematic diagram of an illustrative configuration that may be used for electronic device 10 is shown in FIG. 2. As shown in FIG. 2, electronic device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, near field communications protocols, etc.

Circuitry 28 may be configured to implement control algorithms that control the use of antennas in device 10. For example, circuitry 28 may perform signal quality monitoring operations, sensor monitoring operations, and other data gathering operations and may, in response to the gathered data and information on which communications bands are to be used in device 10, control antenna structures within device 10 being used to receive and process data and/or may adjust one or more switches, tunable elements, or other adjustable circuits in device 10 to adjust antenna performance. As an example, circuitry 28 may control which of two or more antennas is being used to receive incoming signals, may control which of two or more antennas is being used to transmit radio-frequency signals, may control the process of routing incoming data streams over two or more antennas in device 10 in parallel, may tune an antenna to cover a desired communications band, may perform time-division multiplexing operations to share antenna structures between near field and non-near-field communications circuitry, etc.

In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems.

Wireless local area network transceiver circuitry 36 in wireless communications circuitry 34 may handle 2.4 GHz and 5 GHz bands for WiFi® (IEEE 802.11) communications and may handle the 2.4 GHz Bluetooth® communications band.

Circuitry 34 may use cellular telephone transceiver circuitry 38 for handling wireless communications in cellular telephone bands such as bands in frequency ranges of about 700 MHz to about 2700 MHz or bands at higher or lower frequencies.

Wireless communications circuitry 34 may include near field communications circuitry 42. Near field communications circuitry 42 may handle near field communications at frequencies such as the near field communications frequency of 13.56 MHz or other near field communications frequencies of interest.

Circuitry 44 such as satellite navigation system receiver circuitry 35, wireless local area network transceiver circuitry 36, and cellular telephone transceiver circuitry 38 that does not involve near field communications may sometimes collectively be referred to as non-near-field communications circuitry or far field communications circuitry.

Antenna structures 40 may be shared by non-near-field communications circuitry 44 and near field communications circuitry 42.

If desired, communications circuitry 34 may include circuitry for other short-range and long-range wireless links. For example, wireless communications circuitry 34 may include wireless circuitry for receiving radio and television signals, paging circuits, etc. In near field communications, wireless signals are typically conveyed over distances of less than 20 cm. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antenna structures 40. Antenna structures 40 may include one or more antennas. Antennas structures 40 may be formed using any suitable antenna types. For example, antenna structures 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

To accommodate near field communications within the potentially tight confines of device housing 12, antenna structures 40 may be shared between non-near-field communications circuitry 44 and near field communications circuitry 42. When, for example, it is desired to transmit and receive cellular telephone signals or other non-near-field communications, antenna structures 40 may be used by transceiver circuitry 38. When it is desired to transmit and receive near field communications signals, antenna structures 40 may be used to near field communications circuitry 42.

Figure 3:
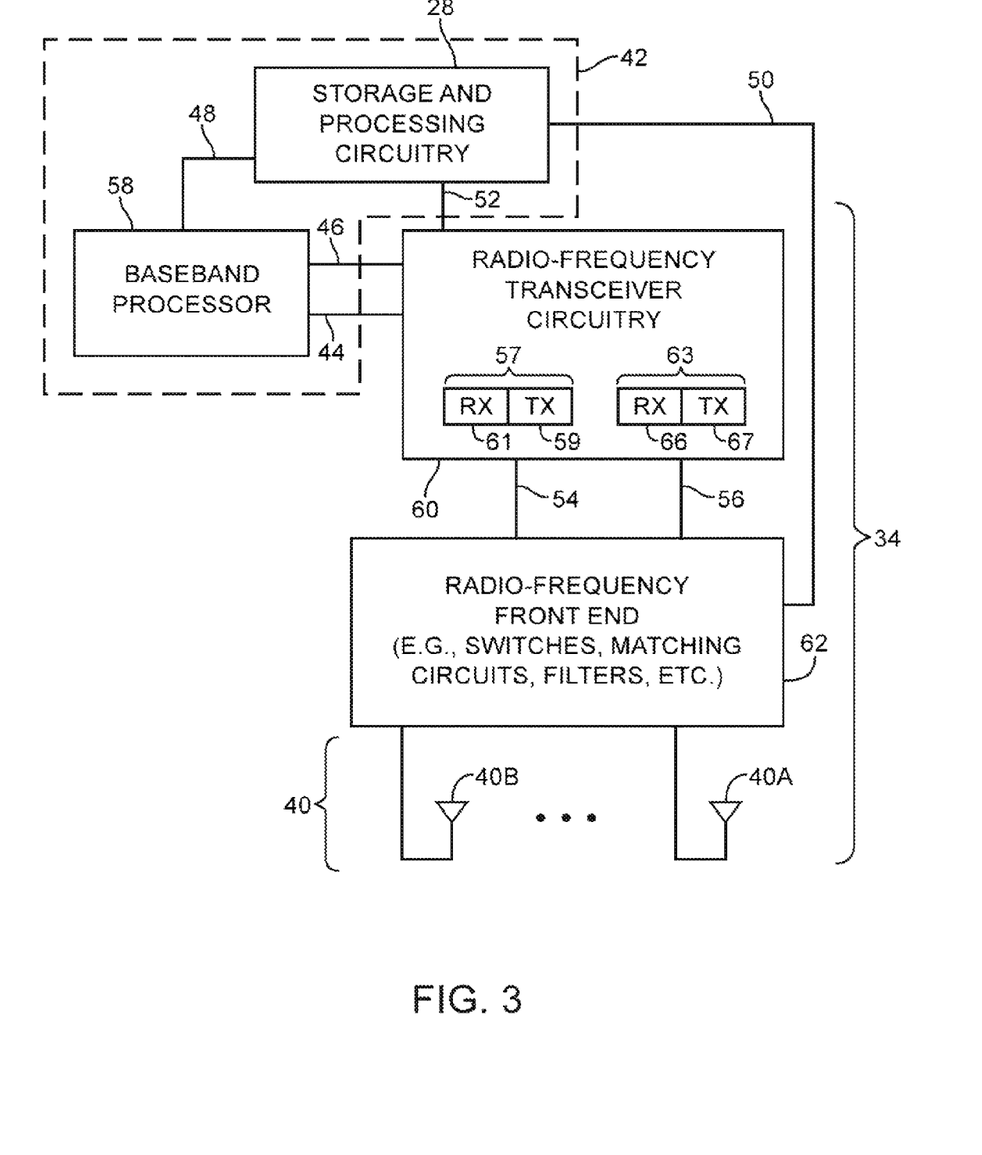
FIG. 3 is a diagram of illustrative wireless circuitry that may be used in an electronic device in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 42 may include storage and processing circuitry 28 (e.g., a microprocessor, memory circuits, etc.) and may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63 (e.g., one or more transceivers that are shared among antennas, one transceiver per antenna, etc.). In the illustrative configuration of FIG. 3, radio-frequency transceiver circuitry 60 has a first transceiver such as transceiver 57 that is associated with path (port) 54 (and which may be associated with path 44) and a second transceiver such as transceiver 63 that is associated with path (port) 56 (and which may be associated with path 46). Transceiver 57 may include a transmitter such as transmitter 59 and a receiver such as receiver 61 or may contain only a receiver (e.g., receiver 61) or only a transmitter (e.g., transmitter 59). Transceiver 63 may include a transmitter such as transmitter 67 and a receiver such as receiver 65 or may contain only a receiver (e.g., receiver 65) or only a transmitter (e.g., transmitter 59).

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by transmitters 59 and 67 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port 54 and receiver 63 at port 56, and paths such as paths 44 and 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, etc. This information may be used in controlling which antenna(s) to use in device 10. For example, a control algorithm running on control circuitry 42 may be used to place device 10 into a dual antenna mode in which both antennas are operating or a single antenna mode in which a single antenna is operating based on channel quality measurements such as these and other information. The control algorithm may also use channel quality measurements to select which antenna to use during single antenna mode operations.

Radio-frequency front end 62 may include a switch that is used to connect transceiver 57 to antenna 40B and transceiver 63 to antenna 40A or vice versa. The switch may be configured by control signals received from control circuitry 42 over path 50. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver between two antennas).

If desired, antenna selection may be made by selectively activating and deactivating transceivers without using a switch in front end 62. For example, if it is desired to use antenna 40B but not antenna 40A, transceiver 57 (which may be coupled to antenna 40B through circuitry 62) may be activated and transceiver 63 (which may be coupled to antenna 40A through circuitry 62) may be deactivated. If it is desired to use antenna 40A but not antenna 40B, circuitry 42 may activate transceiver 63 and deactivate transceiver 57. Combinations of these approaches may also be used to select which antennas are being used to transmit and/or receive signals. When it is desired to receive incoming signals such as paging signals using both antennas, transceiver 57 and transceiver 63 may be simultaneously activated to place device 10 in a dual antenna mode.

Control operations such as operations associated with configuring wireless circuitry 34 to transmit or receive radio-frequency signals through desired antennas 40 may be performed using a control algorithm that is implemented on control circuitry 42 (e.g., using the control circuitry and memory resources of storage and processing circuitry 28 and baseband processor 58).

Figure 4:
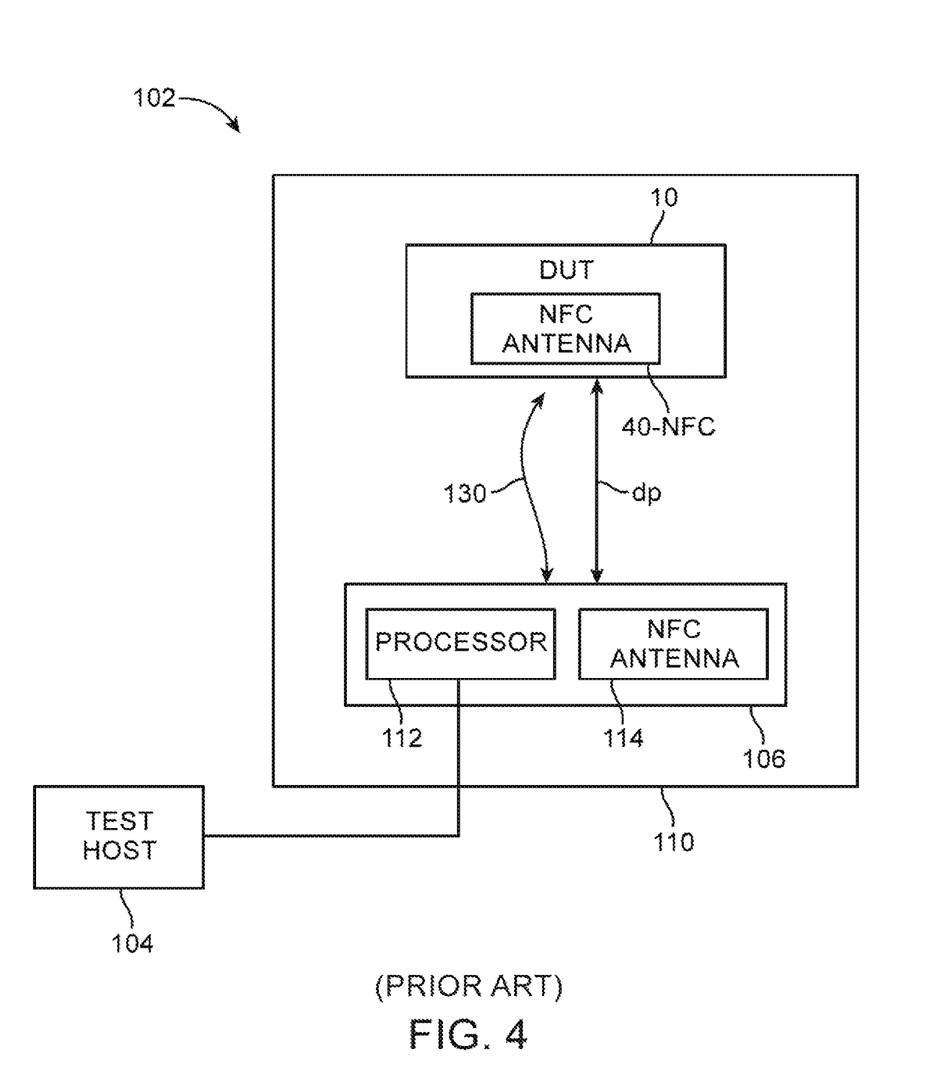
FIG. 4 is a diagram of a test station that is used to perform NFC testing.

During testing, device 10 may be tested in a test system having a test station such as test station 102 of FIG. 4. Electronic devices that are being tested in the test system may sometimes be referred to as devices under test (DUTs). DUT 10 may be loaded with a test operating system (e.g., a simplified operating system that lacks a full Internet Protocol (IP) stack implementation) or a normal user operating system (e.g., an operating system that includes a full Internet Protocol (IP) stack implementation). DUT 10 may include wireless performance measurement circuitry capable of analyzing received test signals. DUT 10 may be capable of computing and storing radio-frequency downlink metrics such as bit error rate measurements, signal-to-noise ratio measurements, measurements on the amount of power associated with incoming wireless signals, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, etc.

A test system may include multiple test stations such as test station 102. Each test station 102 includes a test host 104, a testing device 106, and a test enclosure 110. Test host 104 is a personal computer. Testing device 106 generates NFC test signals to DUT 10 and receives NFC test signals from DUT 10. Testing device 106 receives commands from test host 104.

During testing, DUT 10 is placed within test enclosure 110. Testing device 106 includes a processor 112 and test antenna 114. Processor 112 is coupled to test host 104. Testing device 106 is used for communicating over short distances using near field electromagnetic coupling. Test antenna 114 is used to radiate corresponding near field electromagnetic signals to DUT 10. Test antenna 114 is used during production testing to perform over-the-air testing on DUT 10 (e.g., so that NFC test signals are conveyed between testing device 106 and DUT 10 via NFC test antenna 114).

During testing, test signals are conveyed between test antenna 114 and DUT 10 as indicated by arrow 130. As shown in FIG. 4, DUT 10 and test antenna 114 are separated by a distance dP. Distance dP is within a desired range as determined by product requirements (i.e., test signals between DUT 10 and test antenna 114 should be transmitted and received within a specified distance range). Since typically only one test antenna 114 is used for testing the NFC capabilities of DUT 10, distance dP could be adjusted during testing to be outside of the desired range, resulting in unreliable testing results gathered at test host 104. For example, a test operator could move DUT 10 closer to test antenna 114 to obtain a "pass" even though DUT 10 may not transmit or receive NFC signals according to performance criteria if distance dP is within the desired range (e.g., a false pass may be improperly obtained by simply moving the DUT closer to NFC test antenna 114). It would therefore be desirable to provide a test system that is insusceptible to such types of erroneous test data.

Figure 5:
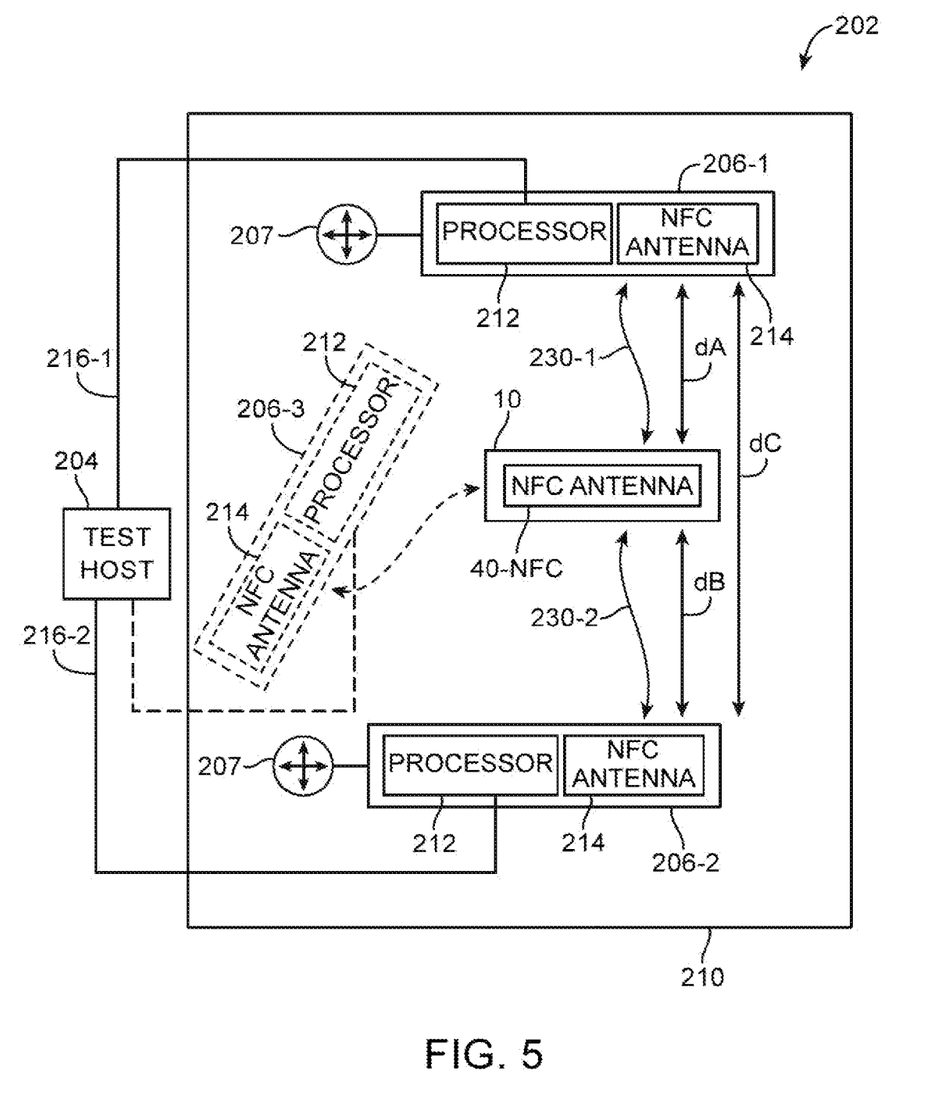
FIG. 5 is a diagram of an illustrative test station that can be used to perform NFC testing in accordance with an embodiment of the present invention.

FIG. 5 shows one suitable arrangement of a test system having a test station such as test station 202 in which DUT 10 may be tested. During testing, many wireless devices (e.g., tens, hundreds, thousands, or more of devices 10) may be tested in the test system. The test system may include test accessories, computers, network equipment, tester control boxes, cabling, test enclosures, and other test equipment for generating and receiving radio-frequency test signals and gathering test results. The test system may include multiple test stations such as test stations 202. There may, for example, be eighty test stations 202 at a given test site. The test system may include any desired number of test stations to achieve desired test throughput.

Each test station 202 may include a test host such as test host 204, multiple testing devices such as NFC testing devices 206-1 and 206-2, and a test enclosure such as test enclosure 210. Test host 204 may, for example, be a personal computer or other types of computing equipment. Test station 202 having two NFC testing devices is merely illustrative. Test station 202 may include any number of testing devices (e.g., test station 202 may include NFC testing device 206-3; NFC testing devices 206-1 and 206-2 may be two of many NFC testing devices). NFC testing devices 206 (e.g., NFC testing devices 206-1 and 206-2) may be placed in any orientation using positioners 207 with respect to DUT 10 in test enclosure 210. In the example of FIG. 5, DUT 10 may be positioned between two parallel NFC testing devices 206 (e.g., DUT 10 may also be oriented parallel to the two testing devices). In certain embodiments, one or more NFC testing devices may be placed in a non-parallel (or "tilted") orientation with respect to DUT 10 (see, e.g., additional NFC testing device 206-3 in FIG. 5). NFC testing devices 206-1 and 206-2 may generate NFC test signals and may be used to perform NFC measurements on signals received from DUT 10.

During testing, at least one DUT 10 may be placed within test enclosure 210. Test enclosure 210 may be a shielded enclosure (e.g., a shielded test box) that is used to provide isolation when performing electromagnetic compatibility radiated tests without experiencing interference from outside environment.

NFC testing devices 206-1 and 206-2 may each have a processor 212 and a test antenna 214. Processor 212 may be coupled to test host 204 via a cable (see, e.g., conductive paths 216-1 and 216-2 connecting processors 212 to test host 204). NFC testing devices 206-1 and 206-2 may be used for testing communication over short distances using near field electromagnetic coupling. Each DUT 10 may include NFC device antenna 40-NFC. Test antenna 214 may be used to radiate corresponding near field electromagnetic signals to NFC device antenna 40-NFC during production test procedures to perform over-the-air testing on DUT 10 (e.g., so that NFC frequency test signals may be conveyed between NFC testing devices 206-1 and 206-2 and DUT 10 via NFC test antenna 214). Test antenna 214 may, as an example, be a microstrip antenna such as a microstrip patch antenna.

During testing, NFC testing devices 206-1 and 206-2, and antenna 40-NFC may convey test signals over-the-air to each other as shown by arrows 230-1 and 230-2, respectively. Test antenna 214 of NFC testing devices 206-1 and 206-2 may be separated from antenna 40-NFC by distances dA and dB respectively. DUT 10 may be marked as a passing DUT by test host 204 if, for example, device antenna 40-NFC is able to transmit and receive test signals from test antenna 214 of both NFC testing devices 206-1 and 206-2 while distances dA and dB are within a specified range.

Unwanted adjustment of distances dA and dB to be outside of the specified range may occur during testing. As an example, if antenna 40-NFC does not properly receive test signals from testing device 206-1, distance dA may be reduced by moving either DUT 10 or NFC testing devices 206 using positioners 207 in an attempt to force DUT 10 to pass the NFC testing. For example, a DUT that is unable to successfully communicate to an NFC testing device 206 may be moved closer to the NFC testing device to obtain a falsely "successful" NFC communication testing result. Alternatively, an NFC testing device may be moved closer using positioners 207 to the unsuccessful DUT to obtain similarly unreliable testing measurements.

To prevent misleading testing results due to unwanted variations in distances dA and dB, test antennas 214 of NFC testing devices 206-1 and 206-2 may be calibrated so that distance dC is within a desired range prior to sending NFC test signals to DUT 10. To ensure that NFC testing devices 206 were not moved closer to DUT 10 after calibration, test host 204 may confirm that distance dC stays within the desired calibrated range throughout testing before allowing a DUT to pass. In other words, a pass for DUT 10 may not be obtained solely based on NFC test data collected via NFC testing devices 206-1 and 206-2. DUT 10 may only be allowed to pass if DUT 10 is physically separated from the NFC testing devices 206 by distances dA and dB within a desired range.

Testing devices 206-1 and 206-2 cannot be moved during testing without being detected by test host 204. Thus, only DUT 10 can be moved to vary distances dA and dB in an attempt to force a poorly performing DUT to pass the NFC testing. Because distance dC is fixed, reducing distance dA necessarily increases distance dB and vice versa. In other words, moving DUT 10 closer to testing device 206-1 (i.e., reducing distance dA) in an attempt to achieve successful NFC communication with testing device 206-1 would require moving DUT 10 farther away from testing device 206-2 (i.e., increasing distance dB). This would result in failed NFC communication between DUT 10 and testing device 206-2. DUT 10 may only be considered a passing DUT if antenna 40-NFC is able to successfully receive signals from and transmit signals to antenna 214 of both testing devices 206-1 and 206-2.

Test station 202 may be calibrated prior to testing to ensure that measurements taken across different test stations, different DUTs, and/or different time points are consistent with one another. Sources of offset (error) that may exist from one test station to another include OTA path loss (e.g., path loss associated with the propagation of NFC frequency signals as they propagate through air, path loss associated with the behavior of each test antenna 214 during actual wireless transmission, etc.) and variations in each testing device 206-1 and 206-2 (e.g., process, voltage, and temperature variations that may affect the operation of each tester).

Path loss can be defined as the attenuation in power as wireless signals propagate through a particular medium. The OTA path loss in each test station 202 is typically unique, because it is challenging to manufacture test components (e.g., test antennas 214) that are exactly identical to one another and to configure each test station 102 with an identical spatial arrangement. Path loss may be sensitive to the location of the test antenna and to the placement of DUT 10 within test chamber 210.

Figure 6:
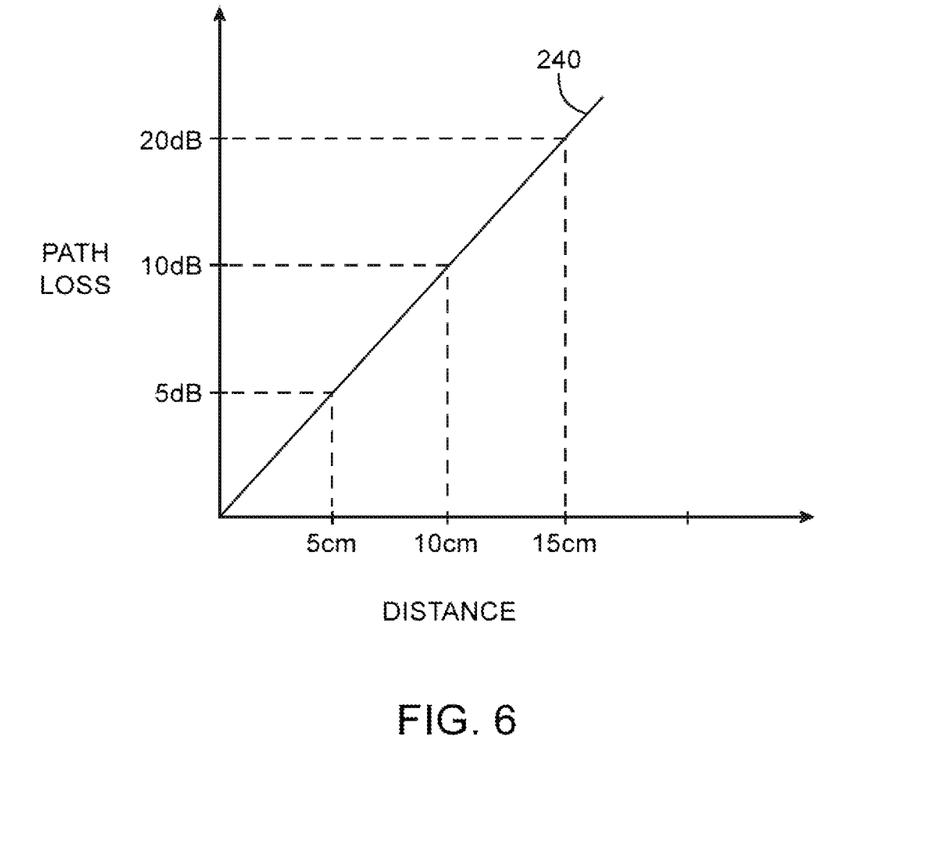
FIG. 6 is a graph plotting path loss versus distance in accordance with an embodiment of the present invention.

FIG. 6 shows an illustrative diagram plotting path loss as a function of the distance between testing devices 206-1 and 206-2. Distance calibration between testing devices may be performed using at least two testing devices 206-1 and 206-2. Test host 204 may direct testing device 206-1 to generate NFC test signals to testing device 206-2 at a requested output power level. Testing device 206-2 may receive the test signals and send corresponding data back to test host 204 data including power level information (e.g., RSSI, RSCP, or other receive signal quality measurements) of the test signals received. To compute downlink path loss, test host 204 may subtract the power level received by testing device 206-2 from the requested output power level. Path loss measured in this way may be recomputed multiple times in the same direction (e.g. sending test signals from testing device 206-1 to testing device 206-2) or in different directions (e.g. sending test signals from testing device 206-2 to testing device 206-1). Path loss measurements may be proportional to the distance dC between testing devices 206-1 and 206-2, so the distance dC can be accurately predicted from path loss measurements according to the trend line 240 of FIG. 6. Test host 204 may recognize deviations from the calibrated distance by monitoring the distance (i.e., through path loss measurements) between NFC testing devices 206-1 and 206-2 throughout testing. Inconsistencies in the measured path loss and the calibrated path loss would indicate that DUT 10 should be re-tested.

Figure 7:
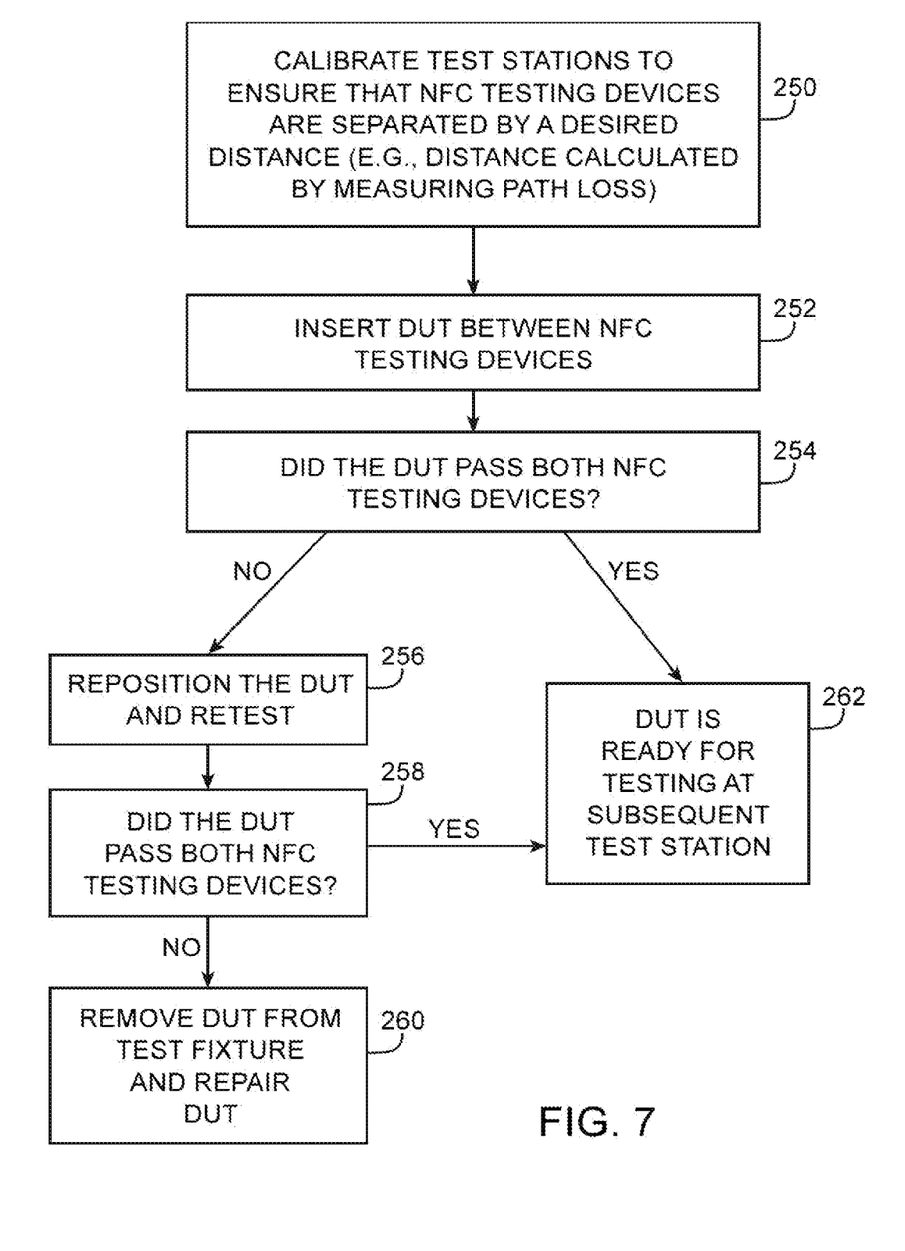
FIG. 7 is a flow chart of illustrative steps for performing NFC testing in accordance with an embodiment of the present invention.

FIG. 7 shows illustrative steps involved in testing DUT 10 using test station 202. At step 250, prior to testing DUT 10, test station 202 may be calibrated to ensure that distance dC between NFC testing devices 206-1 and 206-2 is within a desired range and does not change throughout testing. The test station may be calibrated by measuring path loss between NFC testing devices as described above in connection with FIG. 6.

At step 252, once the test station is calibrated, DUT 10 may be inserted between NFC testing devices 206-1 and 206-2. At step 254, NFC testing devices 206-1 and 206-2 may send NFC test signals to DUT 10 and test host 204 determines whether DUT 10 passes or fails. If the DUT fails at any one of the NFC testing devices, the DUT may be repositioned and retested (step 256). At step 258, test host 204 may once again determine whether DUT 10 satisfies NFC communications criteria with both NFC testing devices 206-1 and 206-2. If DUT 10 still does not pass all NFC testing units after retesting and does not meet satisfactory performance NFC reception criteria, DUT 10 may be removed from test station 202 for repair (step 260). If DUT 10 passes testing with both NFC testing devices 206-1 and 206-2, DUT 10 may be ready for testing at a subsequent test station (step 262).

Figure 8:
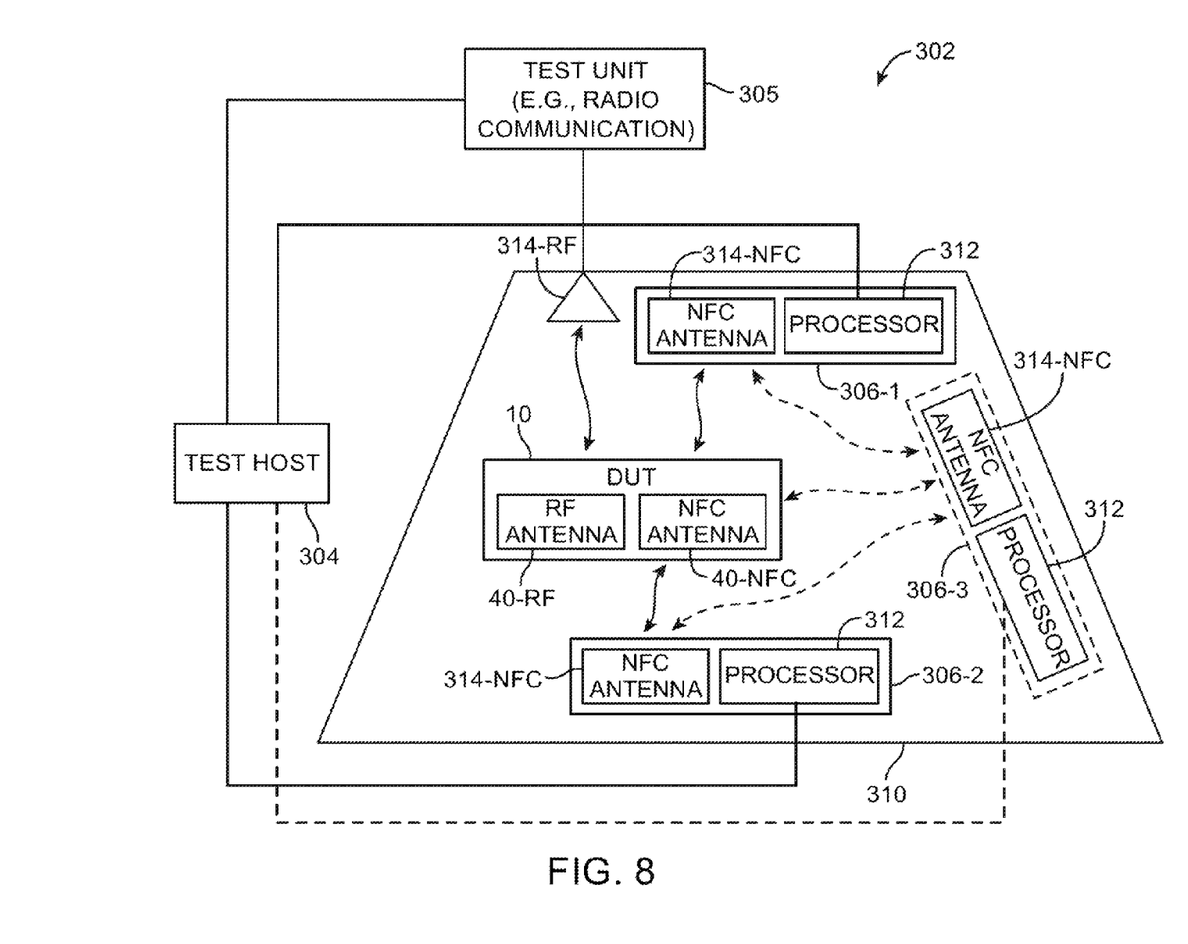
FIG. 8 is a diagram of an illustrative test station that can be used to perform NFC testing and RF testing in accordance with an embodiment of the present invention.

FIG. 8 shows another suitable test system such as a test system having a test station such as test station 302 in which DUT 10 may be tested. The test system may include multiple test stations such as test station 302. Each test station 302 may include a test host such as test host 304, a test unit 305, multiple testers such as NFC testing devices 306-1 and 306-2, and a test enclosure such as test enclosure 310. Test host 304 may, for example, be a personal computer or other types of computing equipment. Test station 302 may include a test unit such as test unit 305. Test unit 305 may be a test unit for radio frequency (RF) communication that includes an RF antenna such as RF test antenna 314-RF. RF testing may occur in an enclosure such as enclosure 310. Test enclosure 310 may be a shielded enclosure (e.g., a shielded test box) that provides RF isolation when performing electromagnetic compatibility radiated tests without experiencing interference from outside environment. Test enclosure 310 may be a transverse-electromagnetic cell (TEM) cell that may include an RF antenna such as RF antenna 314-RF, a DUT such as DUT 10, and NFC testing devices such as NFC testing devices 306-1 and 306-2.

Test station 302 having testing devices 306-1 and 306-2 is merely illustrative. Test station 302 may include any number of testing devices (e.g., test station 302 may include additional NFC testing device 306-3; NFC testing device 306-1 and 306-2 may be two of many testing devices). NFC testing devices 306 may be in any orientation relative to DUT 10 in test enclosure 310 including parallel as shown by NFC testing devices 306-1 and 306-2 and tilted as shown by additional NFC testing device 306-3. NFC testing devices 306-1 and 306-2 may generate NFC test signals and perform NFC measurements on signals received from DUT 10. Test enclosure 310 may also be referred to as TEM cell 310.

Each NFC testing device 306 may have a processor 312 and a NFC test antenna 314-NFC. DUT 10 may have RF antenna 40-RF and NFC antenna 40-NFC. During testing, at least one DUT 10 may be placed within TEM cell 310 between NFC testing device 306-1 and 306-2. Two types of testing may occur in TEM cell 310: RF testing via RF test antenna 314-RF and NFC testing via NFC test antenna 314-NFC. During RF testing, test unit 305 may transmit a test signal via RF test antenna 314-RF at a cellular frequency to test RF communication functionality and performance of RF antenna 40-RF in DUT 10. During NFC testing, test antenna 314-NFC may radiate NFC signals to NFC antenna 40-NFC in DUT 10 to test NFC communication functionality and performance of NFC antenna 40-NFC in DUT 10.

Test station 302 may be calibrated such that NFC testing devices 306-1 and 306-2 are separated by a distance within a specified range. During NFC testing, testing devices 306-1, 306-2, and antenna 40-NFC may convey test signals over-the-air to each other. Testing devices 306-1 and 306-2 may convey test data to each other throughout NFC testing that may include power level information. The power level information may be relayed by processor 312 to test host 304, which can determine whether NFC testing devices 306 are separated by the calibrated distance. If test host 304 detects that the distance between NFC testing devices 306 are not within the desired calibrated range, then test station 302 may be re-calibrated to re-test DUT 10.

Figure 9:
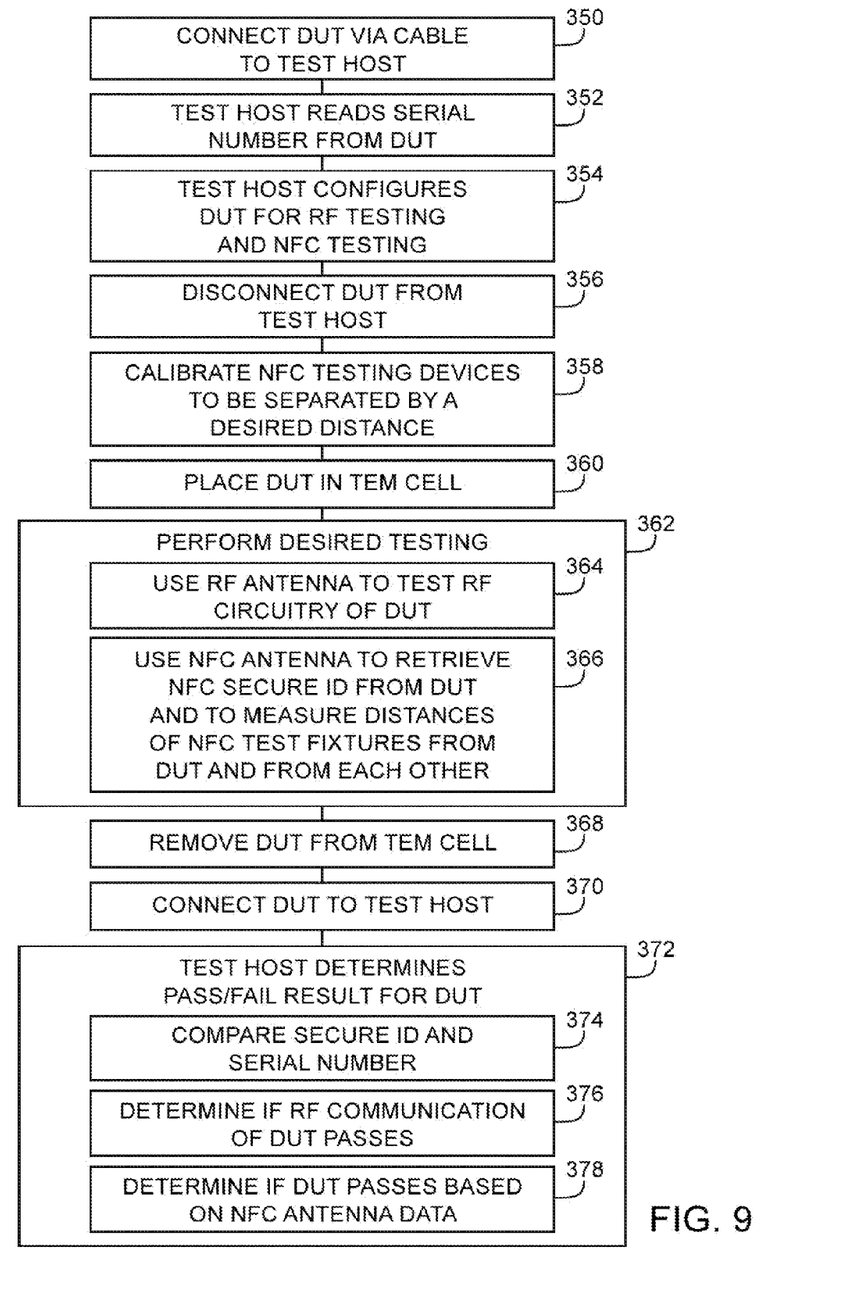
FIG. 9 is a flow chart of illustrative steps for performing NFC testing and RF testing in accordance with an embodiment of the present invention.

FIG. 9 shows illustrative steps for testing DUT 10 using test station 302 of the type described in connection with FIG. 9. At step 350, DUT 10 may be connected via a cable to test host 304. At step 352, test host 304 may read a serial number from DUT 10 (e.g., test host 304 may retrieve a serial number from DUT 10 via a wired path connecting test host 304 to DUT 10). At step 354, test host 304 may configure DUT 10 for RF testing and NFC testing (i.e., to obtain RF and NFC test measurements from DUT 10). At step 356, DUT 10 may be disconnected from test host 304.

At step 358, NFC testing devices 306-1 and 306-2 may be calibrated such that they are separated by a distance within a desired range. At step 360, DUT 10 may be placed in TEM cell 310. At step 362, desired testing may be performed on DUT 10, which may include steps 364 and 366. At step 364, RF test antenna 314-RF may test the performance of RF antenna 40-RF of DUT 10 by sending test signals at frequencies within desired ranges. These ranges may include frequencies corresponding to Global Positioning System (GPS) communications (1575 MHz band), WiFi® (IEEE 802.11) communications (2.4 GHz and 5 GHz bands), Bluetooth® communications (2.4 GHz band), and cellular telephone communications (700 MHz to about 2700 MHz bands).

At step 366, NFC test antenna 314-NFC may retrieve a secure identification (ID) number specific to DUT 10 that can only be retrieved via NFC frequency communication to NFC test antenna 314-NFC. NFC test antenna 314-NFC may also send power data to each other, which can then be relayed via processor 312 to test host 304 to calculate the distance between NFC testing devices 306-1 and 306-2. At step 368, DUT 10 may be removed from TEM cell 310.

At step 370, DUT 10 may be reconnected to test host 304 via a cable. At step 372, test host 304 may determine whether DUT 10 meets all desired performance standards being tested in test station 302. Step 372 may include steps 374, 376, and 378. At step 374, test host 304 may compare the NFC secure ID and the serial number to confirm that DUT 10 was not replaced with another DUT between the serial number reading (step 352) and the NFC secure ID retrieval (step 366) to "cheat" the NFC testing. At step 376, test host 304 may determine whether DUT 10 passes RF testing based on the RF data (acquired at step 364). At step 378, test host 304 may determine whether DUT 10 passes NFC testing based on NFC data (acquired at step 366).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using a test system that includes first and second near field communications testing devices to test a device under test, comprising:
    communicating with the device under test with the first near field communications testing device; while the first near field communications testing device is communicating with the device under test, communicating with the device under test with the second near field communications testing device; and
    determining whether a near field communications device antenna in the device under test satisfies design criteria based on test data gathered using the first and second near field communications testing devices.

2. The method defined in claim 1, further comprising:
    placing the device under test in a shielded test enclosure.

3. The method defined in claim 1, further comprising:
    positioning the device under test between the first and second near field communications testing devices during testing.

4. The method defined in claim 1, wherein communicating with the device under test with the first near field communications testing device comprises sending first test signals to the near field communications device antenna with the first near field communications testing device, and wherein communicating with the device under test with the second near field communications testing device comprises sending second test signals to the near field communications device antenna with the second near field communications testing device.

5. The method defined in claim 1, wherein determining whether the near field communications device antenna in the device under test satisfies the design criteria comprises determining whether communications between the near field communications device antenna and the first near field communications testing device is satisfactory and determining whether communications between the near field communications device antenna and the second near field communications testing device is satisfactory.

6. The method defined in claim 5, further comprising:
    in response to determining that the communications between the near field communications device antenna and the first near field communications test device is satisfactory and that the communications between the near field communications device antenna and the second near field communications test device is satisfactory, determining that the near field communications device antenna in the device under test satisfies design criteria.

7. The method defined in claim 5, further comprising:
in response to determining that the communications between the near field communications device antenna and the first near field communications test device is unsatisfactory, determining that the near field communications device antenna in the device under test fails to satisfy design criteria.

8. The method defined in claim 1, further comprising:
calibrating the test system to ensure that a distance separating the first and second near field communications testing devices is within a desired range.

9. The method defined in claim 8, further comprising:
detecting deviations from the calibrated distance separating the first and second near field communications testing devices by monitoring path loss measurements between the first and second near field communications testing devices; and
in response to detecting deviations from the calibrated distance, determining that the test data gathered using the first and second near field communications testing devices is unreliable.

10. A test apparatus for testing an electronic device, comprising:
a first near field communications testing device that communicates with the electronic device;
a second near field communications testing device that communicates with the device under test while the first near field communications testing device is communicating with the electronic device; and
a test host that determines whether a near field communications device antenna in the electronic device meets desired performance standards based on test data gathered using the first and second near field communications testing devices.

11. The test apparatus defined in claim 10, wherein the first and second near field communications testing devices comprise near field communications testing antennas that receive near field communication signals from the electronic device.

12. The test apparatus defined in claim 10, wherein the first and second near field communications testing devices sends near field communication test signals to the near field communication device antenna in the electronic device.

13. The test apparatus defined in claim 10, further comprising:
a shielded test box in which the electronic device is placed.

14. The test apparatus defined in claim 13, wherein the shielded test box is a transverse-electromagnetic cell that provides isolation from outside environment for the electronic device when the electronic device is subjected to electromagnetic compatibility radiated tests.

15. The test apparatus defined in claim 14, further comprising:
a radio-frequency test unit; and
a radio-frequency test antenna positioned within the shielded text box, wherein the radio-frequency test unit conveys radio-frequency test signals to the electronic device via the radio-frequency test antenna.

* * * * *